No. 754,168. PATENTED MAR. 8, 1904.
R. I. SHERMAN.
GLASS JAR.
APPLICATION FILED OCT. 1, 1903.

NO MODEL.

Witnesses:
Horace A. Crossman.
Thomas B. Booth.

Inventor:
Roger I. Sherman.
by Frederick L. Emery
Atty.

No. 754,168. Patented March 8, 1904.

UNITED STATES PATENT OFFICE.

ROGER I. SHERMAN, OF LEXINGTON, MASSACHUSETTS.

GLASS JAR.

SPECIFICATION forming part of Letters Patent No. 754,168, dated March 8, 1904.

Application filed October 1, 1903. Serial No. 175,271. (No model.)

*To all whom it may concern:*

Be it known that I, ROGER I. SHERMAN, a citizen of the United States, residing at Lexington, in the county of Middlesex and Commonwealth of Massachusetts, have invented an Improvement in Glass Jars, of which the following description, in connection with the accompanying drawings, is a specification, like letters on the drawings representing like parts.

It is a matter of common knowledge that fruits, vegetables, and the like when subjected to the usual processes for the preservation thereof by bottling or canning frequently lose their natural colors. In view of the common practice of preserving such articles in jars which have a transparent wall portion through which the preserved articles may be viewed the desire on the part of the producer or preserver to have his articles appear in their natural colors has led to the almost universal practice of artificially coloring the preserved articles to restore so far as possible the natural and original colors thereof; but this practice has been objected to, because of the alleged harmful nature of the usual coloring-matters, and in some instances the use of such coloring-matters has been prohibited by law. Experience, however, shows that the average customer wishes to see the preserved article through the wall of the inclosing jar, yet he is not satisfied if the color appears unnatural, even though it be absolutely pure and in good condition. Recognizing this and in an effort to provide the desired effect without the objections attending the use of coloring-matters my invention comprehends a jar which has a transparent or translucent wall portion that is treated to give it such necessary and predetermined color as will give to the food, article, or product within a natural coloring when viewed from without. This naturalizing effect predeterminately provided for in the making of the jar may be further heightened by shading or otherwise varying the color treatment or by molding or shaping the wall itself, or by both, according to the results which it is desired to obtain.

To enable my invention to be more clearly understood, I have illustrated in the accompanying drawings one embodiment thereof.

Figure 1:
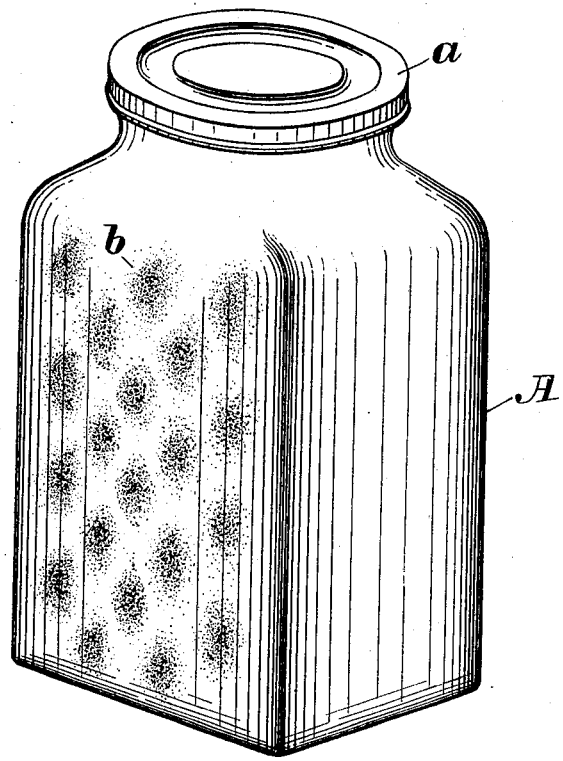
Figure 2:
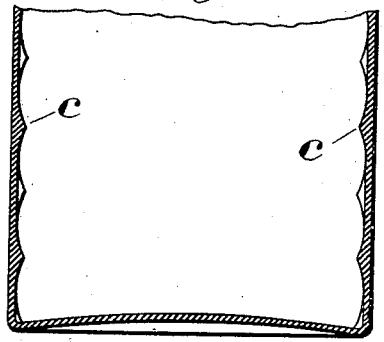

Figure 1 shows in persective a glass jar, illustrating my invention; and Fig. 2, a sectional detail through a transparent wall portion thereof.

In the particular embodiment of my invention selected for illustration and shown in the drawings, the jar A is of molded glass fitted with a suitable removable cover *a*. The term "jar" as here used includes any form of bottle, jar, can, receptacle, or wrapper for the preservation of articles of food and is not restricted as to material, construction, size, shape, or otherwise; further than this that some portion thereof is transparent or translucent to enable the contents of the jar to be seen more or less distinctly from the outside without requiring the removal or opening of the cover *a*.

In the embodiment of my invention here shown the entire jar, excepting possibly the cover, is of transparent glass, and any wall or portion of a wall or the entire jar through which it is desired the contents shall be visible is predeterminately colored to give a predetermined and natural color effect to that portion of the contents of the jar which is exposed to view from the outside. For example, assume that tomatoes or tomato catsup are put up or preserved in the jar shown. Tomatoes, like most other vegetables and fruits, when treated for bottling or preservation in jars lose more or less their natural coloring, so that while naturally attractive and inviting they appear less so through the wall of the jar after having been preserved. For the preservation of tomatoes the wall or walls of the jar A are colored to a predetermined shade of red. This would not be necessarily the natural red color of the tomato, but would be what may be called a "correcting" shade, so that it will give a natural color to the preserved tomatoes when viewed from the outside of the jar, and since tomatoes when ripening partake of a higher coloring in some parts than in others, which have been, perhaps, further removed from the sun, so my invention comprehends giving to the exposed wall or walls of the jar a variable coloring or one which is deeper or higher in spots, as at *b*, than in others to simulate the natural variation in color of the particular article which is designed to be preserved therein. This variation in coloring is in degree and nature dependent upon the article which is to be preserved and is rarely the same for any two articles. Furthermore, articles of food when preserved in this manner are frequently jammed and flattened against the walls of the jar, thereby giving a further unnatural appearance thereto. This also my invention recognizes and corrects by providing for the molding of the transparent wall or walls of the jar to present such irregularities, typified at $c$, Fig. 2, as will give the proper or approximate shape to the distorted contents of the jar when viewed from without. Thus in putting up a line of articles a certain predetermined color or form, or both, will be given to one lot of jars to be used for tomatoes, a different color or formation, or both, to another lot of jars which are to receive strawberries, and so on down the list, providing for each article such predetermined coloring or shading and formation as will naturalize the contained articles when viewed from outside the jar.

I am aware, of course, that it is not new to provide colored bottles and possibly colored jars; but wherever such coloring has been used, so far as known to me, it has been with the idea of giving an arbitrarily-selected color effect to the contents of the bottles or jar without reference to the original or natural coloring thereof, or when the natural coloring has been simulated no attempt has been made to provide a predetermined coloring to produce the effect of natural coloring given by an inclosed article which does not possess that natural coloring.

My invention, I believe, for the first time in the history of the art includes a comprehensive system of coloring or treating transparent or translucent walled portions of jars for the purpose of correcting or naturalizing the appearance of preserved articles within by restoring the natural effects when viewed from the outside of the jars.

Many and obvious advantages flow from my invention. The jars containing the articles may be stacked upon the shelves, as now, and produce the pleasing and inviting effect calculated to draw the trade of the customers, and a customer when calling for a particular preserved article which he feels inclined to order upon viewing the same through the transparent wall of the jar has his inclination confirmed by the natural appearance of the article rather than repelled and possibly changed by an unnatural appearance of what he had in mind. While, therefore, my invention satisfies all the practical demands of business, it is open to none of the objections arising from the use of artificial coloring-matters introduced into and with the articles within the jars.

The term "transparent" is here and somewhat inexactly used to include "translucent" and to comprehend any walled portion through which the contained article or articles may be observed with more or less distinctness.

My invention obviously is not limited to the particular embodiment thereof herein selected for illustration, but may be varied widely within the spirit and scope of my invention.

I claim—

1. The method of producing a jar for naturalizing preserved-food products designed to be placed therein, which consists in providing a transparent wall portion for said jar and in coloring the same predeterminately with reference to the natural color of the preserved-food products thereby to naturalize the exteriorly-viewed color effects of the particular articles of food designed to be viewed therethrough.

2. A naturalizing preserved-food jar provided with a transparent wall portion predeterminately colored with respect to the natural color of the preserved-food products to be placed therein thereby to naturalize the exteriorly-viewed color effects of the particular articles of food designed to be viewed therethrough.

3. The method of producing a jar for holding preserved-food products which consists in providing a transparent wall portion, forming irregularities therein to thereby correct the configuration of the articles of food to be placed within said jar and to be exposed to view through said wall portion, and in coloring said wall portion predeterminately with reference to the natural color of said food articles thereby to naturalize the exteriorly-viewed color effects thereof.

4. A naturalizing preserved-food jar provided with a transparent wall portion having irregularities therein for correcting the configuration of the articles of food to be placed within said jar and to be exposed to view through said wall portion, said wall portion being also predeterminately colored with reference to the natural color of said food articles thereby to naturalize the exteriorly-viewed color effects thereof.

In testimony whereof I have signed my name to this specification in the presence of two subscribing witnesses.

ROGER I. SHERMAN.

Witnesses:
FREDERICK L. EMERY,
EVERETT S. EMERY.